H. D. FLOYD.
ANIMAL POKE OR YOKE.
APPLICATION FILED JULY 31, 1909.

970,484.

Patented Sept. 20, 1910.

WITNESSES:

INVENTOR:

BY

Attorneys

UNITED STATES PATENT OFFICE.

HARRISON D. FLOYD, OF NORTH FORK, WISCONSIN.

ANIMAL POKE OR YOKE.

970,484. Specification of Letters Patent. Patented Sept. 20, 1910.

Application filed July 31, 1909. Serial No. 510,586.

*To all whom it may concern:*

Be it known that I, HARRISON D. FLOYD, a citizen of the United States, residing at North Fork, in the county of Price and State of Wisconsin, have invented or discovered certain new and useful Improvements in Animal Pokes or Yokes, of which the following is a specification, reference being had therein to the accompanying drawings.

This invention relates to animal protectors or pokes designed to prevent the animal wearing the same from passing through fences and into improper places.

One object of the invention is to provide a device of the character referred to which will prevent an animal not only from passing through the space between the wires or rails of fences or other openings, but which will also prevent such animal from inserting its head even into such spaces or openings.

A further object of the invention is to provide an animal poke or yoke which is adjustable for use on animals of various sizes and kinds.

Other objects of the invention are to improve generally devices of this character, and these objects, together with means whereby the invention may be carried into effect, will best be understood from the following detailed description of one form or embodiment thereof illustrated in the accompanying drawings. It is to be understood, however, that the form shown and described has been chosen for illustrative purposes merely, and that many changes may be made therein without departing from the spirit and scope of the invention.

Figure 1:
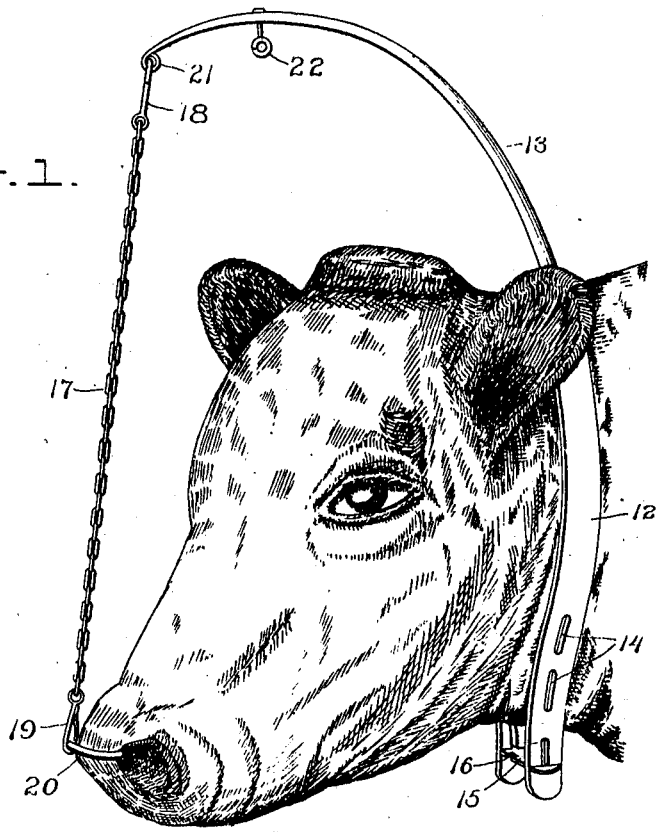
Figure 2:
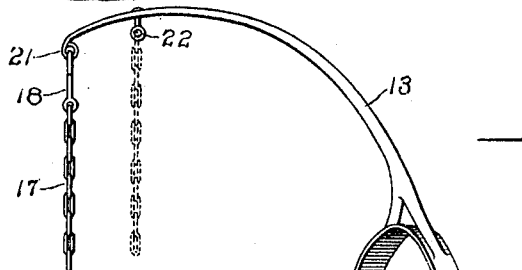

In the drawings: Figure 1 is a view illustrating a device constructed in accordance with the present invention in operative position on the neck of the animal. Fig. 2 is a perspective view of the same removed.

In the construction shown my improved protector comprises a yoke 12, adapted to fit and be clasped about the neck of the animal on which the device is to be used, and an upwardly and forwardly curved horn 13 carried by said yoke. In order to adapt the yoke 12 to animals of different sizes and kinds the following construction may be employed. The body of the yoke is preferably constructed of flexible, resilient material, such as spring steel, and is connected at points more or less remote from its lower ends, by a bar having a plurality of devices each adapted to engage one or more of the ends of the yoke. In the form shown the lower ends of the yoke are each provided with a plurality of slots 14, coöperating with a flat bar 15, having its edges adjacent each end provided with a plurality of notches 16 leaving between them projections 16ª to engage the sides of the yoke. The bar 15 may be passed, flatwise, through any pair of slots 14, to regulate the length of the yoke, the ends of the yoke being then forced inwardly to regulate its width, and the bar thereafter given a quarter turn to cause suitable pairs of the notches 16 to engage the ends of the yoke and lock the same in position.

Devices of this general character, as heretofore constructed, while adapted to prevent the animal from passing its body into or through openings in fences or elsewhere, have nevertheless permitted the insertion of the head thereinto, with the result that the head, nose, or chin of the animal have frequently been injured by coming in contact with barbed wire or other sharp or ragged projections at the edges of such openings. For other reasons, also, as will be obvious, it is desirable to prevent the introduction of the head of the animal into improper places.

In order to prevent the results above noted, my invention includes means, carried by the yoke 12 and preferably adapted for connection with the nose of the animal, for engaging the sides of an opening prior to the introduction of the animal's head therein. To this end said means are preferably extended to or beyond a position substantially in a vertical plane with the nose of the animal wearing the yoke. In the construction shown the horn 13 is extended forwardly to a point substantially directly above the nose of the animal, and is connected with the nose by a chain or other means 17, said chain being preferably provided with snap hooks 18 and 19 for connection with the horn 13 and nose ring 20, respectively. As will now be seen, any attempt on the part of the animal to introduce its head into an opening in a fence or elsewhere, will cause the end of the horn 13 or the connector 17 to be brought into contact with the fence rail or other obstruction, and the animal checked in an obvious manner as soon as its nose reaches a point opposite such rail or obstruction.

In order further to adapt the device to animals of different sizes and kinds, the horn 13 is preferably provided at its outer end with a ring 21, adapted to receive the snap hook 18, and at a short distance back of its end with a second open sided ring or hook 22 adapted to be engaged with one of the links of the chain 17 as shown in dotted lines in Fig. 2. With this arrangement it will be seen that the ring 21 may be used with a full length of chain, or the ring or hook 22 with a shortened chain as the circumstances may require.

It is obvious that the space in the yoke 12 may be varied to accommodate animals of different sizes, as bulls, cows, pigs, sheep, etc. by other means than that shown. For example, instead of being provided with the slots 14 the yoke 12 might have a series of apertures of different shape through which a round or square transverse bar might be passed, and said bar might be provided with adjustable stops of any kind in order to increase or lessen its working length, as by being screw threaded on one or both ends and provided with a nut or nuts which might be placed in any desired positions. The invention is, therefore, not to be understood as being limited to the particular construction herein shown.

As a poke for use on hogs the invention has proved to be eminently successful, as a hog to which the improved poke has been applied cannot go through openings in fences, pens, etc., which are of such vertical dimensions as to cause contact of the chain or other connection from the yoke or poke to the ring in the animal's nose.

Having thus described my invention I claim and desire to secure by Letters Patent:

1. In a device of the character described, the combination with a yoke adapted to fit the neck of an animal, of an upwardly and forwardly extending horn rigid with said yoke, and means for connecting said horn with the nose of the animal.

2. In a device of the character described, the combination of a yoke adapted to fit the neck of an animal and having each of its lower ends provided with a plurality of slots, a flat bar adapted to enter said slots and having formed in its edges a plurality of notches each adapted to engage one of the ends of said yoke, an upwardly and forwardly curved horn rigid with said yoke, and means for connecting said horn with the nose of the animal.

3. A yoke adapted to fit the neck of an animal and having an upwardly and forwardly curved extension which is rigid therewith, said yoke being provided at its forked lower portions with a plurality of apertures, combined with a transverse bar adapted to be placed in any of said apertures, and which is provided with means whereby its working length may be varied, a nose-ring, and a chain for connecting the forward end of said extension with the said nose-ring.

4. In a device of the character described, the combination with a yoke adapted to fit the neck of an animal, of a horn projecting from said yoke and provided with a plurality of attaching devices, and means for connecting said horn with the nose of said animal and adapted to be engaged with any of said attaching devices.

In testimony whereof I affix my signature, in presence of two witnesses.

HARRISON D. FLOYD.

Witnesses:
M. P. MORNSEN,
R. S. BURSHEM.